[19] United States Patent
Kapp

[11] Patent Number: 4,881,673
[45] Date of Patent: Nov. 21, 1989

[54] RETRACTIBLE SUPPORT BAR

[75] Inventor: Gregory W. Kapp, Coloma, Mich.

[73] Assignee: Innocorp Manufacturing, Inc., Coloma, Mich.

[21] Appl. No.: 184,355

[22] Filed: Apr. 21, 1988

[51] Int. Cl.⁴ .............................................. B60R 7/08
[52] U.S. Cl. .................................... 224/311; 224/917
[58] Field of Search ................. 224/42.45 R, 42.45 A, 224/42.46 R, 42.46 A, 42.46 B, 282, 311, 313, 325, 917, 922; 248/317, 505, 309.1; 211/70.5, 81, 96, 97, 100, 105.1, 123, 168, 171; 16/115, DIG. 1, DIG. 12, DIG. 19, DIG. 24, DIG. 41, 125, 126; 190/115, 117; 294/137; 27/1, 2

[56] References Cited

U.S. PATENT DOCUMENTS

| | | | |
|---|---|---|---|
| 888,079 | 5/1908 | Furman | 16/115 |
| 2,780,330 | 2/1957 | Lifton | 16/126 |
| 4,544,050 | 10/1985 | Segnhaeve | 190/39 |
| 4,686,741 | 8/1987 | Moore et al. | 16/112 |
| 4,713,860 | 12/1987 | Mobley et al. | 16/112 |
| 4,775,072 | 10/1988 | Lundblade et al. | 16/112 |

Primary Examiner—Henry J. Recla
Assistant Examiner—Glenn T. Barrett
Attorney, Agent, or Firm—Flynn, Thiel, Boutell & Tanis

[57] ABSTRACT

A retractible support-bar assembly for supporting various kinds of objects in a vehicle. A base member has an outwardly facing surface with a generally U-shaped, outwardly opening, recess therein. A generally U-shaped bar having a pair of spaced legs which lie in a common plane with a bight portion of the bar is provided. The U-shaped bar is conformed in size to be received in the U-shaped recess and conformed in thickness so as to provide a surface thereon which is flush with the outwardly facing surface of the base member when the bar is received in the U-shaped recess. A pivot for pivotally securing the bar to the base member is provided so that the bar is movable into and out of the recess. The pivot is provided adjacent the free ends of the legs of said U-shaped bar. The plane of the bar is, when the bar extends out of the recess, inclined to the outwardly facing surface at a defined angle. A releasable latch is provided for holding the bar in the recess so that a release of the latch will enable the bar to pivot out of the recess to expose and thereby render accessible the bight portion of the bar to enable various of the objects to be supported therefrom.

8 Claims, 2 Drawing Sheets

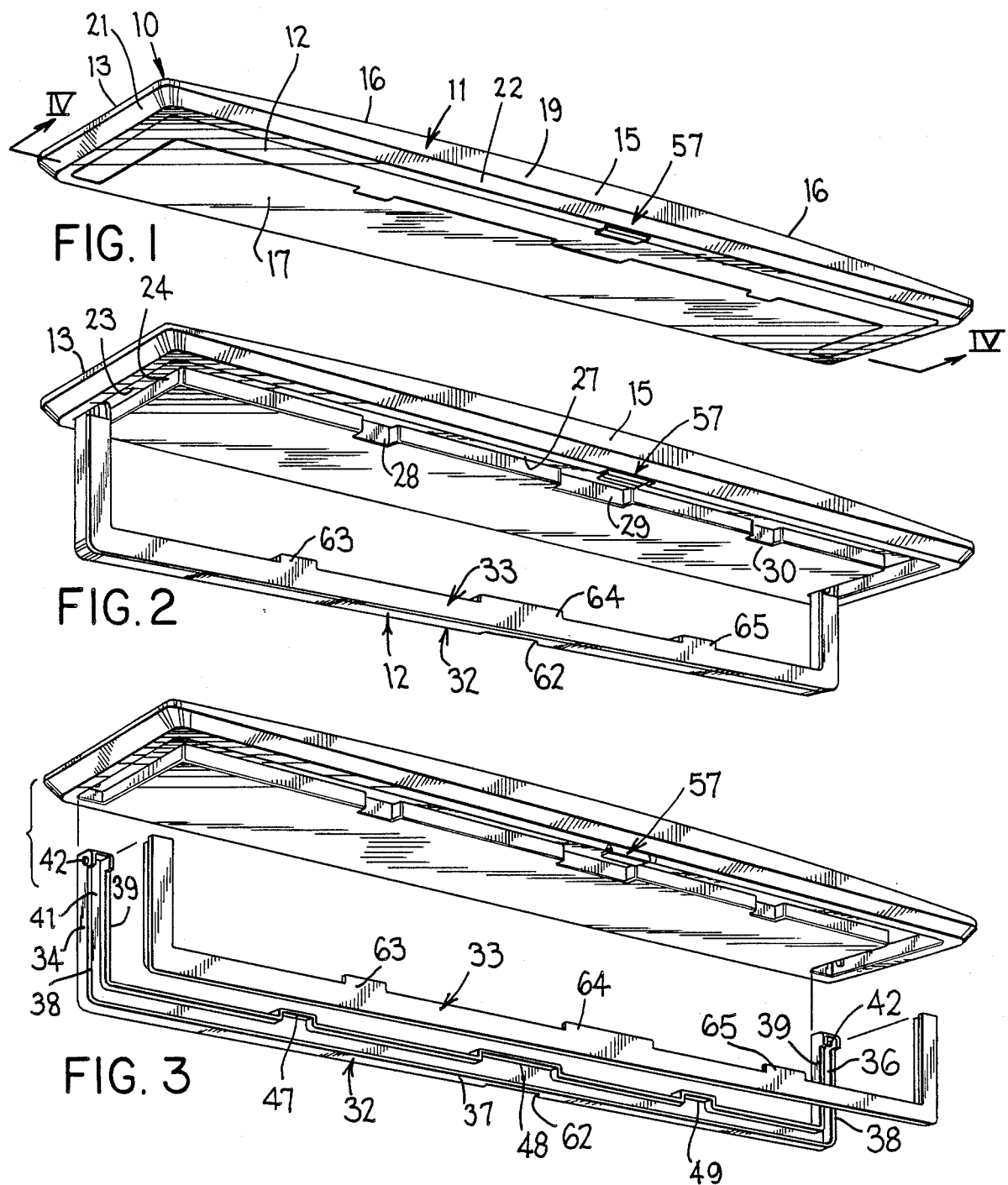

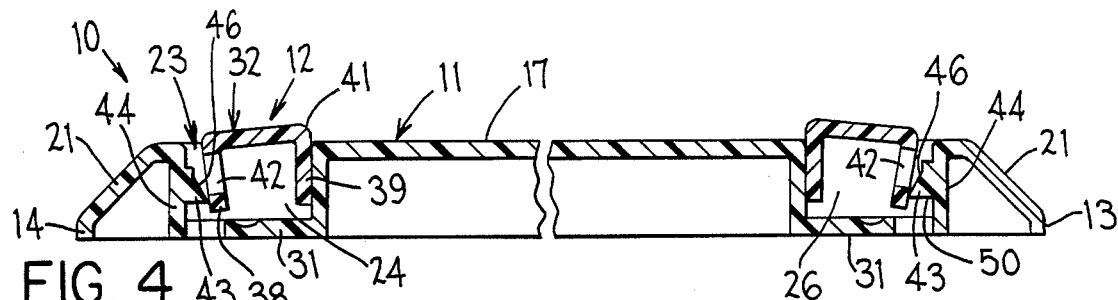
FIG. 4
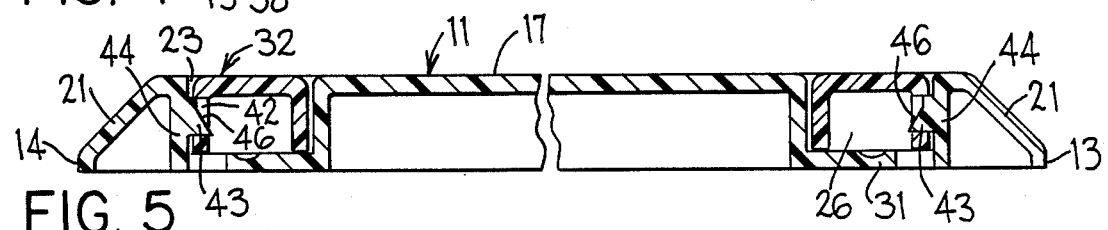
FIG. 5
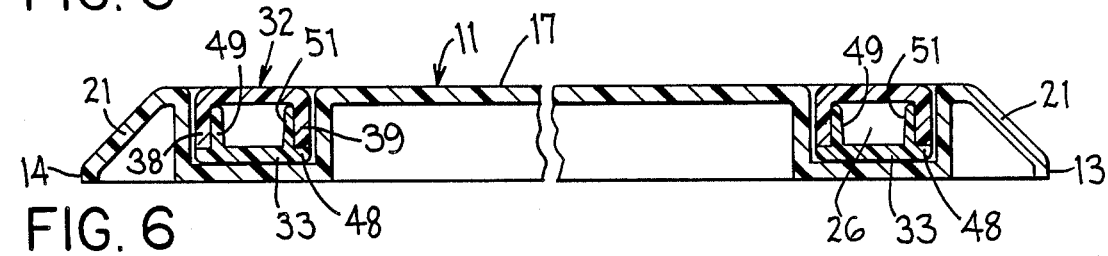
FIG. 6
FIG. 7    FIG. 8    FIG. 9
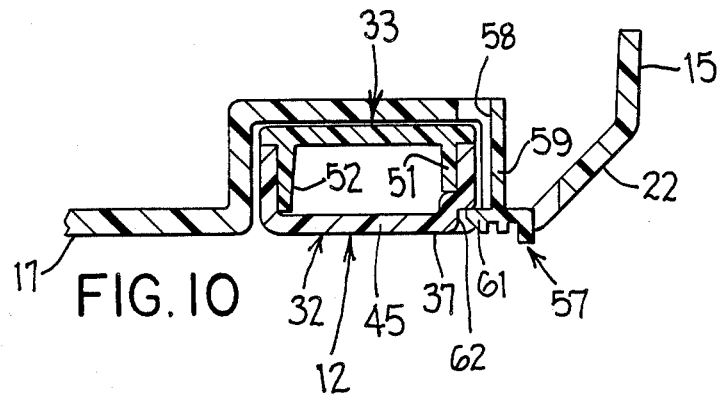
FIG. 10

RETRACTIBLE SUPPORT BAR

FIELD OF THE INVENTION

This invention relates to a support bar and, more particularly, to a retractible support-bar assembly for supporting various kinds of objects in a vehicle.

BACKGROUND OF THE INVENTION

It is often desirable in truck vans with customized interiors to provide one or more support-bar like or hook/ring devices enabling clothes hangers with clothes thereon to be suspended from the support-bar like or hook/ring device. As a result, and in most customized van interiors, a support-bar like device is provided laterally across the width of the interior of the van to enable clothes to be hung on hangers and suspended from the bar. The bar is usually located adjacent the rear of the van so that access to the clothing hung on hangers thereat will be readily accessible through the rear doors of the van.

In some instances, fishermen desire to transport fishing rods in the interior of the van. Similarly, skiers would prefer to transport the skis in the interior of the van. It is obviously desirable to transport the fishing rods and skis inside the van in order to prevent road dirt, ice and other contaminants from working themselves into the interior of the fishing reels and ski bindings.

Heretofore, fishing rods, skis and other like generally elongated objects have only been able to be stored on the floor of the van extending lengthwise of the van under the seats or along one side wall of the van interior or in an aisle. This has been generally unacceptable for long trips due to the fact that persons inside the van moving about will frequently accidentally step on the fishing rods and/or the skis possibly damaging them.

Therefore, it is highly desirable to provide a support capable of supporting clothes on hangers as well as enabling a supporting of elongated objects, such as fishing rods and/or skis, off from the floor of the van and in a generally out of the way location.

Accordingly, it is a primary object of this invention to provide a retractible support-bar assembly for supporting various kinds of objects in a vehicle, particularly from one or more support bars fixedly attached to the sidewalls and/or the ceiling of the interior of the van.

It is a further object of the invention to provide a support bar that is retractible in nature such that when the support bar is in an extended position, it will facilitate various objects to be supported therefrom and/or thereon.

It is a further object of the invention to provide a retractible support-bar assembly capable of being retracted into a stored position which is generally flush with the support-bar construction, thereby having a pleasing exterior appearance when the support bar is not in use.

It is a further object of this invention to provide a retractible support-bar assembly, as aforesaid, which, when in its extended position, enables various kinds of objects to be suspended therefrom as well as supported thereon.

It is a further object of this invention to provide a retractible support-bar assembly, as aforesaid, which is made of a moldable synthetic resin material and is capable of assembly without the use of special tools and, once assembled, is difficult to disassemble thereby making the retractible support-bar assembly durable and long lasting.

It is a further object of the invention to provide a retractible support-bar assembly, as aforesaid, which is of a length less than the width of the interior of the van thereby enabling plural of such retractible support bars to be spaced lengthwise along the length of the ceiling of the van thereby enabling plural support bars to be suspended from the ceiling to enable a support of elongated objects on plural support bars thereof.

In general, the objects and purposes of the invention are met by providing a retractible support-bar assembly having structure defining a housing with an outwardly facing surface thereon. The housing has a generally U-shaped, outwardly opening, recess in the outwardly facing surface. A generally U-shaped bar, having a pair of spaced legs which lie in a common plane with a bight portion of the bar, is conformed in size to be received in the U-shaped recess. Pivot structure is provided for pivotally securing the bar to the housing so that the bar is movable into and out of the recess. A releasable latch is provided for holding the bar in the recess. A release of the latch will enable the bar to pivot out of the recess to expose and thereby render accessible the bight portion of the bar to enable various of the objects to be supported thereon and therefrom.

BRIEF DESCRIPTION OF THE DRAWINGS

Other objects and purposes of the invention will be apparent to persons acquainted with support-bar constructions of this general type upon reading the following specification and inspecting the accompanying drawings, in which:

FIG. 1 is a perspective view of a retractible support-bar structure with the support bar thereof being in the retracted position;

FIG. 2 is a perspective view similar to FIG. 1, but with the support bar in the extended position;

FIG. 3 is an exploded perspective view similar to FIG. 2 but illustrating the two part construction of the support bar;

FIG. 4 is a sectional view taken along the line IV—IV of FIG. 1 and shown in an inverted position;

FIG. 5 is a sectional view similar to FIG. 4 but with the support bar supported for pivotal movement relative to a housing member;

FIG. 6 is a sectional view similar to FIGS. 4 and 5 but with the support bar having an additional member connected thereto to render the support bar detachably connected to the housing member;

FIGS. 7, 8 and 9 illustrate various positions of the support bar in its movement relative to the housing member; and FIG. 10 is an enlarged fragment of FIG. 6, which fragment is inverted from the position illustrated in FIG. 6.

DETAILED DESCRIPTION

Certain terminology will be used in the following description for convenience in reference only and will not be limiting. The words "in" and "out" will refer to directions toward and away from, respectively, the geometric center of the device and designated parts thereof. Such terminology will include the words above specifically mentioned, derivatives thereof and words of similar import.

A retractible support-bar assembly 10 is illustrated in FIGS. 1 and 2 and includes a base member 11 and a support bar 12 that, in this particular embodiment, is pivotally secured to the base member 11. The retractible support-bar assembly 10 is specifically adapted to conform to the interior ceiling configuration in the interior of a customized van. In this regard, the end facing surfaces 13 and 14 of the base member 11 are thinner, in a top to bottom dimension, than the central portion of the front and rear facing surfaces 15. In this particular embodiment, the top edge 16 of the base member 11 extends in a straight line between the top edges of the end facing surfaces 13, 14 and the central portion of each of the front and rear facing surfaces 15. In some installations, of course, it may be desirable to have the central portion 15 made to be the same dimension as the ends 13 and 14. This latter construction is not shown in the drawings.

The base member 11, when suspended from a ceiling as shown in FIGS. 1 and 2, has a downwardly facing surface 17 and the four edge facing surfaces 13, 14 and 15, only two, 13 and 15, of which are illustrated in FIGS. 1 and 2. The edge facing surfaces 13, 15 as well as the two other edge surfaces not shown extend in planes that are generally perpendicular to the plane of the downwardly facing surface 17. A beveled surface 21 extends between the downwardly facing surface 17 and the end surfaces 13 and 14 (see FIG. 4). Similarly, a beveled surface 22 extends between the downwardly facing surface 17 and the edge surfaces 15 (see FIG. 10).

The base member 11 has a recess 23 (FIG. 2) therein adapted to receive the support bar 12 therein as illustrated in FIG. 1. The recess 23 is generally U-shaped having a pair of parallel leg segments 24 and 26 and a bight segment 27 connecting the recesses formed by the two leg segments 24 and 26. In this particular embodiment, the bight portion 27 of the recess 23 is enlarged by notches 28, 29 and 30 for purposes which will be explained in more detail below.

Plural holes 35 (FIG. 7) are provided in the bottom wall section 31 of the recess 23 for purposes of receiving screws (not illustrated) to facilitate a securement of the base member 11 to a wall surface, such as the ceiling surface in the inside of a customized van. The holes can, if desired, be countersunk to enable the head of the screw to be received entirely within the countersinking in a conventional manner.

The support bar 12 is comprised of two parts 32 and 33 as shown in FIG. 3. The first part 32 has a generally U-shape and has parallel leg sections 34 and 36 and an inner connecting bight section 37. The entirety of the first part 32 has a generally U-shaped cross section as illustrated in FIG. 4. The U-shaped cross section includes a pair of parallel leg sections 38 and 39 and an interconnecting bight section 41. In this particular embodiment, the leg sections 38 and 39 are generally yieldably flexible with respect to the bight section 41. A hole 42 is provided in the free end of the leg sections 34 and 36, particularly in the wall of the leg sections 38.

The recess or leg segments 24 and 26 of the U-shaped recess 23 in the base member 11 each have a protuberance 43 on a sidewall 44 of the respective recess segments 24, 26. Each protuberance 43 is generally cylindrical in its cross section and has an inclined surface 46 on the free end thereof such that the inclined surface faces inwardly into the recess segments 24 and 26 as well as out of the respective recess sections.

The spacing between the outer surfaces of the U-shaped leg sections 38 and 39 of the first part 32 of the support bar 12 are generally equal to or just slightly less than the spacing between the inside facing surfaces of the opposed walls in each of the recess sections 24 and 26. As a result, the protuberances 46 would generally prevent the entirety of the first part 32 from being received in the respective recess 23, particularly the recessed segments 24 and 26. However, and as stated above, the leg sections 38 and 39 of the first part 32 are generally yieldably flexible relative to the bight section 37 and, as a result, the first part 32 can be placed generally into alignment with and into the U-shaped recess 23 by orienting the enlarged width sections 47, 48 and 49 with the notches 28, 29 and 30, respectively, in the recess 23. Since the protuberances 46 will prevent the free end of the leg sections 38 and 39 of the first part 32 from being entirely received within the confines of the recessed sections 24 and 26, applying a downward pressure on the leg sections 34 and 36 of the first part 32 will cause the leg sections 38 and 39 to yieldably flex, as illustrated in FIG. 4, to allow the free edge of the leg sections 38 to slide on the inclined surface 46 to facilitate a movement of the leg section 38 beyond the protuberances 46 to enable the protuberances 43 to be received entirely within the holes 42 to render the first part 32 pivotal relative to the base member 11. Since the lower most surface 50 of each of the protuberances 43 has a greater axial dimension than the remainder portion of the protuberances, it will not be easy to undue the pivotal connection between the first part 32 and the base member 11 without the use of a tool.

The pivotal connection between the first part 32 and the base member 11 can be rendered permanent by inserting the second part 33 into the U-shaped recess in the first part 32 to render the leg sections 38 and 39 non-flexible. More specifically, and referring to FIG. 6, the second part 33 includes a flat strip 45 conforming in shape to the shape of the first part 32. That is, the lateral edges of the strip 45, including its enlargements 63, 64 and 65, are aligned with the outwardly facing surfaces of the leg sections 38 and 39 as well as the bight portion 37 which includes the enlargements 47, 48 and 49. A pair of generally parallel legs 51 and 52 extend from one side surface of the strip 45. The laterally outwardly facing surfaces of each of the legs 51 and 52 are spaced by a distance that is generally equal to or just slightly greater than the spacing between the opposing surfaces of the leg sections 38 and 39. Further, the length of each of the legs 51 and 52 is just slightly less than the depth of the recess in the U-shaped first part 32. Since the spacing between the laterally outwardly facing surfaces on the legs 51 and 52 is equal to or just slightly greater than the normal relaxed spacing between the opposing surfaces of the leg sections 38 and 39, the legs 51 and 52 can be inserted with the application of an appropriate force to the strip 45 into the spacing between the leg sections 38 and 39 so as to be frictionally held therein in the position illustrated in FIG. 6. As a result, the leg sections 38 and 39 will no longer be yieldably flexible relative to the bight section 41 and, therefore, the pivotal connection provided by the protuberances 43 is rendered permanent. The only way in which the support bar 12 can now be removed from the base member 11 is to separate the first part 32 from the second part 33 to again render the leg sections 38 and 39 yieldably flexible relative to the bight section 41. Only then, a tool may be utilized to flex the leg sections 38 and 39 to facilitate passage of the protuberance 43 out of the hole 42 to enable the first part 32 of the support bar 12 to be removed from the base member 11.

A detent mechanism 53 is provided for holding the support bar 12 in its extended position illustrated in FIG. 2. More specifically, the detent mechanism 53 comprises a dimple 54 in the bottom wall 31 in each of the recessed leg segments 24 and 26 adjacent the protuberances 43. A pimple or bead 55 is provided on a wall 56 that joins the free end edges of the leg sections 38 and 39 as well as the bight portion 37, which bead 55 is on a side of the wall 56 remote from the protuberances 46 as shown in FIG. 7. Thus, as the support bar 12 is pivoted about the axis of the protuberances 46 through to the position illustrated in FIG. 8, the pimple or bead 55 engages the wall 31 and is prevented from being received in the dimple 54. A force applied to the support bar 12, particularly the bight portion thereof will enable the support bar 12 to be pivoted until the pimple 55 is wholly received within the dimple 54, namely, the position illustrated in FIG. 9. The support bar 12 can be manually returned to the recess 23.

A latch mechanism 57 is provided on the base member 11 along one edge of the bight segment 27 of the recess 23, particularly in a centrally located position relative to the length of the bight segment 27. FIG. 10 illustrates in cross section the structure of the latch mechanism 57. More specifically, a through opening 58 is provided in the base member 11 so as to form a hinge-like structure enabling a part of the sidewall of the bight segment 27 of the recess 23 to form a lever 59. The lever has a tab 61 on its free end thereof. An indented step 62 is provided on the first part 32 of the support bar 12, which step has a surface over which lies the tab 61 on the free end of the lever 59. Thus, by pivoting the lever 59 away from the step 62, the tab 61 will move to a position wherein it does not overlie the step thereby allowing the support bar 12 to pivot. More specifically, the support bar will drop automatically out of the recess 23 under the influence of gravity until the pimple or bead 55 engages the bottom wall 31 of the recessed leg segments 24 and 26, such as is illustrated in FIG. 8. The support bar will stop pivoting at that point requiring a manual force to be applied to the support bar to move it to the FIG. 9 position causing the pimple or bead 55 to be wholly received within the dimple 54 thereby releasably locking the support bar in the extended position.

A pair of retractible support-bar assemblies 10 mounted at spaced locations inside of a van and so that the planes of the two U-shaped support bars are parallel and oriented one behind the other will enable, when the support bars are in the extended position, elongated objects, such as fishing rods and skis, to be supported on the two bight segments 27 and extending therebetween. The enlargements on the bight segments 27 will prevent the supported objects from sliding excessively relative to the bight segment as the van is steered around curves or corners in the roadway.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A retractible support-bar assembly for supporting various kinds of objects in a vehicle, comprising:

means defining a base having an outwardly facing surface, said base means having a generally U-shaped, outwardly opening, recess in said outwardly facing surface;

a generally U-shaped bar having a pair of spaced legs which lie in a common plane with a bight portion of said bar, said U-shaped bar being conformed in size to be received in said U-shaped recess in said base means and conformed in thickness so as to provide a surface thereon which is flush with said outwardly facing surface of said base means when said bar is received in said U-shaped recess;

pivot means for pivotally securing said bar to said base means so that said bar is movable into and out of said recess, said pivot means including protuberances projecting into said recess and being located adjacent the free ends of said legs of said U-shaped bar, said plane of said bar being, when said bar extends out of said recess, inclined to said outwardly facing surface at a defined angle;

said bar including first and second parts, said first part being generally U-shaped in cross section throughout its length with legs of the U adjacent said free ends having openings therein adapted to receive therein said protuberances, said legs of said first part being resiliently yieldable to allow at least said free ends of said legs to move past said protuberances to facilitate introduction of said protuberances into said openings, said second part being conformed in its shape to said first part to facilitate it being operatively secured to an open side of said first part defined by an open end of said U-shaped cross section to render said resiliently yieldable legs of said first part rigid so as to prevent removal of said protuberances from said openings; and releasable latch means for holding said bar in said recess;

whereby a release of said latch means will enable said bar to pivot out of said recess to expose and thereby render accessible said bight portion of said bar to enable various of said objects to be supported therefrom.

2. The retractible support-bar assembly according to claim 1, wherein second part is generally U-shaped in cross section but the lateral spacing between outside facing surfaces of said legs thereon is generally equal to an inside spacing between said legs on said first part to eliminate said resiliently yieldable capability thereof and prevent removal of said protuberances from said openings.

3. The retractible support-bar assembly according to claim 1, wherein said pivot means includes detent means for releasably holding said bar, while said bar extends out of said recess, in a fixed extended position.

4. The retractible support-bar assembly according to claim 3, wherein said detent means includes a dimple in the interior of said recess of said base means adjacent the free ends of the legs of said U-shaped recess; and wherein said bar has means defining bumps conforming in size to said dimples on said free ends of said legs thereof, said bumps being adapted to be received into said dimples when said bar is pivoted out of said recess into said extended position thereof.

5. The retractible support-bar assembly according to claim 1, wherein said housing means and said bar are molded plastic component.

6. The retractible support-bar assembly according to claim 1, wherein said releasable latch means includes a lever movably mounted on said base means between first and second positions, said lever having a tab overlapping, when in said first position thereof, an outwardly facing surface on said bar to effect a holding of said bar in said first position, said tab being movable from said first overlapping position to said second position thereof to enable said bar to be moved therepast to said extended position thereof.

7. The retractable support-bar assembly according to claim 1, wherein said base means includes structure conforming the base means to a ceiling construction inside a motor vehicle so that said bar will pivot downwardly out of the recess means in the base means for purposes of facilitating a suspension of various of said objects therefrom.

8. The retractible support-bar assembly according to claim 1, wherein said U-shaped bar is conformed in thickness so as to provide a surface thereon which is flush with said outwardly facing surface of said base means when said bar is received in said U-shaped recess.

* * * * *